United States Patent
Lee et al.

(10) Patent No.: US 7,439,290 B2
(45) Date of Patent: Oct. 21, 2008

(54) LINEAR LOW DENSITY POLYETHYLENE COMPOSITIONS AND FILMS

(75) Inventors: Chun D. Lee, Cincinnati, OH (US); Manivakkam J. Shankernarayanan, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 386 days.

(21) Appl. No.: 11/033,793

(22) Filed: Jan. 12, 2005

(65) Prior Publication Data

US 2006/0155028 A1   Jul. 13, 2006

(51) Int. Cl.
*C07C 67/08* (2006.01)
(52) U.S. Cl. .................... 524/310; 524/522; 524/523
(58) Field of Classification Search ............ 524/310, 524/515, 522, 523
See application file for complete search history.

(56) References Cited

U.S. PATENT DOCUMENTS

| | | | |
|---|---|---|---|
| 4,350,655 A | 9/1982 | Hoge | |
| 4,472,328 A | 9/1984 | Sugimoto et al. | |
| 4,777,073 A | 10/1988 | Sheth | |
| 5,695,868 A | 12/1997 | McCormack | |
| 6,072,005 A | 6/2000 | Kobylivker et al. | |
| 6,075,179 A | 6/2000 | McCormack et al. | |
| 6,106,956 A | 8/2000 | Heyn et al. | |
| H1955 H | 4/2001 | Middlesworth et al. | |
| H2000 H | 11/2001 | Middlesworth et al. | |
| 6,534,166 B1 | 3/2003 | Pip et al. | |
| 6,540,949 B2 | 4/2003 | Pip et al. | |
| 6,638,636 B2 | 10/2003 | Tucker | |
| 6,682,803 B2 | 1/2004 | McCormack et al. | |
| 2002/0068182 A1* | 6/2002 | Kelch et al. | 428/463 |
| 2005/0059754 A1 | 3/2005 | Lunt et al. | |
| 2006/0155028 A1* | 7/2006 | Lee et al. | 524/386 |

OTHER PUBLICATIONS

Harrell, E.R., et al..: *Journal of Applied Science*, vol. 29: 995-1010 (1984) "Modified Cole-Cole Plot Based on Visoelastic Properties for Characterizing Molecular Architecture of Elastomers" John Wiley & Sons, Inc.

Han, C.D., et al.: *Polymer Engineering Reviews*, vol. 2, No. 2: 135-165 (1982) "Temperature-Independent Correlation of Elastic Responses of Visoelastic Liquids".

N. Nakajima, et al.: *Current Topics in Polymer Science*, vol. II: 150-165 (1987) "Modified Cole-Cole Plot as a Tool for Rheological Analysis of Polymers."

Morieras, G.: "Calcium Carbonates for Microporous Breathable Films Market & Product Requirements" Addcon World Conference 2001 (Berlin). *Addcon World 2001*: Paper No. 10.

Harrell, E.R., et al.: *Journal of Applied Science*, vol. 29:995-1010 (1984) "Modified Cole-Cole Plot Based on Visoelastic Properties for Characterizing Molecular Architecture of Elastomers" John Wiley & Sons, Inc.

N. Nakajima, et al., *Current Topics in Polymer Science*, vol. II: 150-165 (1987) "Modified Cole-Cole Plot as a Tool for Rheological Analysis of Polymers."

* cited by examiner

*Primary Examiner*—Peter D Mulcahy
(74) *Attorney, Agent, or Firm*—William A. Heidrich; Gerald A. Baracka

(57) ABSTRACT

Linear low density polyethylene compositions suitable for the production of films having improved breathability are provided. The compositions which are comprised of a linear low density polyethylene base resin, a functionalized polyolefin and a polyester polyol are melt blended under conditions of mixing and shear to increase their melt elasticity.

12 Claims, No Drawings

US 7,439,290 B2

LINEAR LOW DENSITY POLYETHYLENE COMPOSITIONS AND FILMS

BACKGROUND OF THE INVENTION

1. Field of the Invention

The invention relates to extrudable linear low density polyethylene (LLDPE) compositions and films produced therefrom which exhibit improved gas/vapor permeability. More specifically, the invention is directed to compositions and films comprised of LLDPE, a modified polyolefin and a polyester polyol. Additionally, the invention relates to a process of producing said compositions.

2. Description of the Prior Art

Breathable polyolefin films, i.e., films that are gas/vapor permeable, are increasingly in demand for medical and personal care applications. Polyolefin films, primarily polyethylene films, having increased water vapor transmission rates (WVTR) are commonly produced by incorporating high levels, e.g., 20-80 weight percent (wt. %) filler material, such as calcium carbonate, and monoaxially or biaxially stretching the film. By stretching the film after extrusion, voids are formed around the filler particles which permits diffusion through the film.

Breathable films of the above type are disclosed in U.S. Pat. No. 4,472,328. The reference discloses compounding the polyolefin resin, filler and liquid or waxy hydrocarbon elastomer such as hydroxyl-terminated liquid polybutadiene, to produce a porous film or sheet.

U.S. Pat. No. 4,350,655 discloses a porous polyolefin film containing at least 50 percent by weight of a surface coated inorganic filler. The inorganic fillers are surface coated with a fatty acid ester of silicon or titanium.

A problem with polymer films rendered breathable by incorporation of filler materials is that the incorporation of fillers also reduces the strength of the films. Reduction in tensile strength and elongation at break is disadvantageous and some references, such as U.S. Pat. No. 4,777,073, use specific combinations of resins and fillers and specific processing techniques in an effort to minimize these problems.

Still others utilize multi-layer constructions wherein a breathable core layer is combined with one or two skin layers. For example, U.S. Pat. No. 6,075,179 discloses films having a core layer formed from a mixture of thermoplastic resin and particulate filler coextruded with one or two adjacent support layers to increase strength. These support or skin layers account for a minor percentage of the total film thickness—typically less than 15%. A disadvantage of the skin layers is that they tend to reduce the moisture vapor breathability of the overall film since they block the pathways created by the pores in the core layer. The thicker the skin layer(s), the greater the reduction in breathability.

U.S. Pat. No. 6,682,803 seeks to overcome this problem by utilizing a mixture of two incompatible polymers for the skin layer(s). The incompatibility of the polymers results in the formation of cracks and/or tears when the laminate is stretched so that their presence does not significantly impair the moisture vapor breathability of the overall film.

There is a continuing need for polyolefin compositions which can be extruded into films having increased breathability and which are suitable for use as skin layers for porous core layers and for other applications. It would be even more advantageous if these compositions were produced using readily available commercial materials and if the resulting films, in addition to having increased WVTR and oxygen permeability, also exhibited a good balance of physical properties. These and other objectives are achieved with the compositions and films of the present invention.

SUMMARY

The invention relates to linear low density polyethylene compositions and to films produced therefrom which exhibit improved breathability. The compositions are comprised by 70 to 97 weight percent, based on the total weight of the composition, linear low density polyethylene base resin; 2.5 to 25 weight percent, based on the total weight of the composition, modified polyolefin containing acid or acid derivative functionality; and 0.5 to 5 weight percent, based on the total weight of the composition, polyester polyol. More specifically, the LLDPE base resin is a copolymer of ethylene and a $C_{3-8}$ α-olefin having a density from 0.890 to 0.930 g/cm$^3$ and melt index from 0.1 to 10 g/10 min, the modified polyolefin is a polyethylene resin grafted with an unsaturated carboxylic acid or carboxylic anhydride; and the polyester polyol is an aliphatic polyester polyol having a hydroxyl number from 50 to 115 mg. KOH per gram.

To obtain compositions suitable for the production of films which exhibit improved breathability, the LLDPE, modified polyolefin and polyester polyol are subjected to what is referred to herein as reactive compounding, that is, the components are melt blended under conditions of mixing and shear such that the melt elasticity of the resulting melt blended product is at least 40 percent higher than that of the LLDPE base resin. In an even more preferred embodiment, the melt elasticity is 65 percent or higher compared to that of the LLDPE base resin. Films produced from such rheologically modified compositions exhibit significantly increased WVTR and oxygen permeability.

In one highly useful embodiment the composition contains 80 to 94 weight percent LLDPE base resin, 5 to 15 weight percent modified polyolefin and 1 to 5 weight percent polyester polyol. Blown and cast films of the composition, particularly those having thicknesses from 0.5 to 5 mils, have improved WVTR and oxygen permeability.

DETAILED DESCRIPTION OF THE INVENTION

Compositions of the invention and films produced therefrom which exhibit improved breathability, namely increased WVTR and oxygen permeability, are comprised of LLDPE, a modified polyolefin and a polyester polyol. To achieve improved breathability, blends of the above components are subjected to reactive melt compounding to effect a change in the rheological properties, more specifically, to increase melt elasticity. Films produced from the resulting rheologically modified compositions exhibit improved WVTR, determined in accordance with ASTM F 1249, and oxygen permeation, determined in accordance with ASTM D 3985. The compositions are readily extrudable and have melt indexes (MIs) from 0.1 to 10 g/10 min and, more preferably, from 0.5 to 5 g/10 min. MIs provided herein are determined in accordance with ASTM D 1238-01, condition 190/2.16.

To obtain compositions having the requisite properties, a base resin having LLDPE as the sole or predominant component is employed. LLDPE resins are typically produced by the copolymerization of ethylene with one or more $C_{3-8}$ α-olefin comonomers using transition metal catalysts in accordance with well-known processes and are characterized by linear molecules having no long-chain branching. Short-chain branching is instead present and is one of the primary determinants of resin density and physical properties. Useful LLDPEs have densities from 0.890 to 0.930 g/cm$^3$ and, more preferably, from 0.905 to 0.922 g/cm³. Densities are determined in accordance with ASTM D 1505. MIs are typically in the range 0.1 to 10 g/10 min. and, more preferably, from 0.5 to 5 g/10 min. Linear low density polyethylene resins produced using metallocene catalysts, i.e., mLLDPEs, may also be used for the base resin component.

Comonomers typically copolymerized with ethylene to obtain LLDPEs useful for the invention include propylene, 1-butene, 4-methyl-1-pentene, 1-hexene, 1-octene and mixtures thereof. By incorporating these comonomers, linear polymer molecules having short-chain branches along the polymer backbone are produced. The amount of comonomer will typically not exceed 35 weight percent and, most commonly, the comonomer comprises from about 2 to 25 weight percent of the LLDPE polymer composition. The specific comonomer or comonomer mixture used is primarily based on process compatibility and the desired resin specifications. LLDPE resins which are copolymers of ethylene and butene-1 and/or hexene-1 have been found to be particularly advantageous for the compositions of the invention. For best processability and film extrusion it is advantageous if the LLDPE have a molecular weight distribution (MWD) greater than 3. MWD is determined from the weight average molecular weight (Mw) and number average molecular weight (Mn) which are obtained by gel permeation chromatography. MWD=Mw/Mn. LLDPEs useful for the invention are available from commercial sources.

The base resin may be a single LLDPE resin or a mixture of two or more LLDPEs. Also, the LLDPE or LLDPE mixture can be combined with other compatible film grade polyolefin resins. If the LLDPE is combined with another resin, the LLDPE will constitute the major component of the blend, i.e., be present in an amount greater than 50 weight percent, based on the total weight of the base resin.

Polyolefin resins which can be utilized with the LLDPE include homopolymers of ethylene, copolymers of ethylene and α-olefins and copolymers of ethylene and comonomers containing polar groups such as $C_{1-4}$ alkyl esters of acrylic and methacrylic acids. Ethylene-propylene copolymers are representative of ethylene/α-olefin copolymers which can be included in minor amounts. Copolymers of ethylene and polar comonomers, typically containing 1 to 35 weight percent and, more preferably, 2 to 25 weight percent comonomer, include by way of illustration ethylene/methyl acrylate and ethylene/n-butyl acrylate copolymers.

When the base resin is a mixture of LLDPE with another polyolefin, the polyolefin preferably will not exceed 40 weight percent of the mixture. Generally, the polyolefin will constitute from 2 up to about 35 weight percent and, more preferably, 2 to 30 weight percent of the base resin.

In one embodiment where the base resin is a mixture of LLDPE with another polyolefin resin, low density polyethylene (LDPE) is employed. LDPE homopolymers will generally have densities from about 0.910 to about 0.935 g/cm³ and MIs from 0.5 to 15 g/10 min. LDPEs having densities from 0.915 to 0.930 and MIs from 1 to 10 are most advantageous.

A modified polyolefin containing acid or acid derivative functionality is combined with the LLDPE base resin to obtain the improved compositions of the invention. Modified polyolefins are known and, most commonly, are grafted polyethylenes obtained by reacting unsaturated carboxylic acids and carboxylic acid anhydrides, or derivatives thereof, with polyethylene under grafting conditions. The grafting monomers, i.e., acid, acid anhydride or derivative, are incorporated along the polyethylene backbone.

Modified polyethylene resins grafted in accordance with known procedures include ethylene homopolymer resins and copolymer resins of ethylene with propylene, butene-1, hexene-1 and octene-1 produced utilizing known polymerization technologies including metallocene and single-site polymerization processes. Also, mixtures of two or more homopolymers or copolymers of the above types may be grafted. In a particularly useful embodiment of the invention, the modified polyolefin is a grafted high density polyethylene (HDPE) or grafted LLDPE. Densities of the HDPE will generally be from 0.94 to 0.965 g/cm³ whereas LLDPE densities will be in the same range as described for the base resin.

Carboxylic acids or anhydrides useful as grafting monomers include compounds such as acrylic acid, maleic acid, fumaric acid, citraconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride, bicyclo(2.2.1)hept-5-ene-2,3-dicarboxylic acid or anhydride, tetrahydrophthalic acid or anhydride, methylbicyclo(2.2.1)hept-5-ene-2,3-dicarboxylic acid or anhydride, nadic anhydride, methyl nadic anhydride, himic anhydride, and methyl himic anhydride. Acid anhydride derivatives which can be used to graft the polyethylene include dialkyl maleates, dialkyl fumarates, dialkyl itaconates, dialkyl mesaconates, dialkyl citraconates and alkyl crotonates. It may be desirable to use a mixture of grafting monomers to vary the physical properties of the modified polyolefin product. Maleic anhydride is a particularly useful grafting monomer.

Grafting is accomplished in accordance with known procedures, generally by heating a mixture of the polyolefin and graft monomer(s) with or without a solvent. Most typically, the grafted products are prepared by melt blending the polyethylene with the grafting monomer in the substantial absence of a solvent in a shear-imparting extruder/reactor. Twin screw extruders such as those marketed by Coperion (formerly Werner-Pfleiderer) under the designations ZSK-53 and ZSK-83 are especially useful for carrying out the grafting operation. A free radical generating catalyst, such as an organic peroxide, can be employed but is not necessary.

The amount of carboxylic acid, anhydride or derivative grafted onto the polyolefin can range from about 0.2 up to about 4 wt. %. In a highly useful embodiment of the invention where the modified polyolefin is maleic anhydride grafted HDPE or LLDPE, the amount of maleic anhydride grafted is in the range from about 0.4 to 3.5 wt. %. The MI of the graft-modified polyolefin is generally in the range from about 0.5 to about 20 g/10 min.

The third component included with the base resin and modified polyolefin to obtain the improved compositions of the invention is a polyester polyol. Useful polyester polyols are commercially available and widely used as raw materials for polyurethanes. They are typically viscous liquids or waxy solids depending on their structure and molecular weight. Polyester polyols derived from saturated aliphatic or aromatic dicarboxylic acids and diols or mixtures of diols are most advantageously employed. However, other polyester polyols, e.g., those obtained by the reaction of caprolactone with diols or those obtained using higher functionality polyols, may also be used.

Polyester polyols used for the invention are obtained by processes known to the art using carboxylic reactants which can include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, isophthalic acid, terephthalic acid, phthalic acid, hemimellitic acid, 1,4-cyclohexanedicarboxylic acid, dimethyl terephthalate, phthalic anhydride, sidestream by-products obtained from the manufacture of phthalic acid, terephthalic acid, dimethyl terephthalate and the like or mixtures thereof. Representative polyols which can be used include ethylene glycol, propylene glycol, dipropylene glycol, trimethylene glycol, 1,2-butanediol, 1,4-butanediol, trimethylol propane, diethylene glycol and the like or mixtures thereof.

In one highly useful embodiment of the invention, aliphatic polyester polyols, i.e., polyester polyols derived from aliphatic dicarboxylic acids and aliphatic diols are employed. It is even more advantageous when these aliphatic polyester polyols have hydroxyl numbers (mg. KOH per gram) from 50 to 115 and, more preferably, from 50 to 70. In an especially useful embodiment, the polyester polyols are derived from adipic acid and $C_{2-6}$ aliphatic diols or mixtures of $C_{2-6}$ aliphatic diols with trimethylol propane and/or diethylene glycol.

Compositions of the invention useful for the production of films having increased breathability contain 70 to 97 wt. % base resin, 2.5 to 25 wt. % modified polyolefin, and 0.5 to 5 wt. % polyester polyol. Weight percentages of the components are based on the total weight of the composition. The compositions, after reactive compounding, will have MIs from 0.1 to 10 g/10 min. and, more preferably, from 0.5 to 5 g/10 min. Especially useful compositions contain 80 to 94 wt. % LLDPE base resin, 5 to 15 wt. % maleic anhydride grafted HDPE or LLDPE and 1 to 5 wt. % polyester polyol.

The compositions may also contain other additives commonly used for the formulation and production of polyethylene films. Such additives may include but are not limited to processing aids, antioxidants, heat stabilizers, UV absorbers, antistatic agents, lubricants and the like. The total amount of such additives will generally not exceed about 5 wt. % of the composition and, most preferably, will range between about 0.01 and 2.5 wt. %.

While one of the primary advantages of the invention is the ability to produce films having improved breathability without the incorporation of filler materials, it is nevertheless possible, where the application permits, to include one or more conventional fillers such as calcium carbonate, clays, silica, alumina, barium sulfate, sodium carbonate, talc, magnesium sulfate, barium carbonate, titanium dioxide or the like.

Whereas the base resin, modified polyolefin and polyester polyol may be combined and blended in any manner, to obtain compositions which exhibit improved breathability when extruded into film the components are subjected to reactive compounding, i.e., melt mixing all of the components under conditions which impart sufficient mixing and shear to effect a change in rheological properties. More specifically, the components are melt blended under conditions such that the melt elasticity (ER) of the composition is at least 40 percent (%) greater than the ER of the base resin. It is even more advantageous when the ER is increased 65% or more over that of the base resin.

ER is a measure of polydispersity derived from rheological data of polymer melts. It is affected by characteristics on a molecular level, e.g., molecular weight distribution, the presence and type of branching, molecular entanglement, etc. Determination of ER utilizes frequency response data in the linear viscoelastic region. That is, ER is derived from the measured dynamic storage modulus, G', and loss modulus, G", as a function of frequency. Generally speaking, G' is a measure of energy stored and recovered per cycle of sinusoidal deformation and G", is a measure of energy dissipated or lost as heat per cycle. In one method, G' versus G" is plotted in logarithmic coordinates. Curves of this sort are generally known as Modified Cole-Cole Plots as described, for example, by E. R. Harrel, et al., in *Journal of Applied Polymer Science*, Vol. 29, pp. 995-1010 (1984); C. D. Han, et al., in *Polymer Engineering Reviews*, Vol. 2, No. 2, pp. 135-165 (1982); and N. Nakajima, et al., in *Current Topics in Polymer Science*, Vol. II, Ottenbrite, et al., Eds., Hanser Publishers (1987), the contents of all of which are incorporated herein by reference, including ASTM D 4440-84 entitled "Standard Practice for Rheological Measurement of Polymer Melts Using Dynamic Mechanical Properties."

Data can be generated using any rheometer capable of measuring dynamic mechanical properties of polymer melts over a wide range of frequencies, such as a Rheometrics Mechanical Spectrometer Model 605 or 705 or Rheometrics Dynamic Analyzer RDA2 or ARES Analyzer. ER values reported herein were determined at 170° C. for frequencies ranging from 0.0398 to 398 rad/sec using an ARES Analyzer and 25 mm parallel plates. ER is computed by fitting in G' versus in G" for the nine lowest frequency points to a linear equation and extrapolating to calculate G' at $G''=5\times10^3$ dynes/cm². ER is then calculated from the equation:

$$ER=(1.781\times10^{-3})G' \text{ at a value of } G''=5\times10^3 \text{ dynes/cm}^2$$

While the nature and extent of molecular interactions which occur during reactive compounding are not fully understood, the result is an increase in ER and an unexpected increase in WVTR and oxygen permeability of films produced therefrom. Neither the modified polyolefin or polyester polyol, when employed individually at comparable levels with the base resin, increase the ER when melt compounded in the same manner. Based on this observation, it is unexpected that using a combination of the two components with a base resin will produce a significant increase in melt elasticity (ER) upon melt compounding and that films produced from the resulting melt compounded product will have significantly improved WVTR and oxygen permeation.

To prepare the compositions, all of the components can be dry blended or various masterbatching techniques can be employed and the resulting mixture subjected to reactive compounding. The preparation of concentrates or masterbatches is a widely utilized procedure for formulating compositions comprised of a plurality of polymeric components. The procedure is particularly advantageous for incorporating components employed in relatively small amounts and/or where a component is not readily compatible with one or more of the other components and insures intimate and uniform mixing.

In one highly useful embodiment of the invention, the polymeric polyol is first melt blended with all or a portion of the base resin and the resulting masterbatch then combined with the modified polyolefin and, optionally, additional base resin and melt blended under conditions sufficient to bring about the requisite increase in ER. This procedure is advantageous since it enables the masterbatch to be prepared in advance and later utilized for preparation of the final product. In such a case, the masterbatch would typically be pelletized and combined with pellets of the modified polyolefin and, optionally, additional pelletized base resin. This facilitates feeding the materials to the mixer/extruder for the reactive compounding operation. In a similar manner, the compositions obtained from the reactive compounding operation may be pelletized for convenient storage and subsequent film preparation.

The compositions of the invention are readily processable and are suitable for the preparation of either blown or cast film using conventional equipment and processing conditions. The term film, as employed herein, is intended to encompass both films (products with thicknesses of 10 mils or less) and sheets (products with thicknesses greater than 10 mils). Typically, however, films of 5 mils or less are employed for applications where high WVTR and oxygen permeability are desired. The compositions of the invention are therefore most advantageously used for the production of films having thicknesses of 0.5 to 5 mils and, more preferably, for films which are 0.5 to 2.5 mils thick.

The application for which the film will be used will generally dictate whether films of the compositions of the invention will be produced by blowing or casting procedures. Cast films typically have less gauge variation and better clarity whereas blown films are generally considered to have an advantage where strength is a primary consideration.

Conventional continuous blown film processes whereby the molten composition is fed by an extruder through the die gap (0.8 to 2 mm) of an annular die to produce a molten tube that is pushed vertically upward while feeding air to the interior of the tube to stretch and expand the tube can be used. The volume of air injected into the tube controls the size of the tube, i.e., the blow-up ratio (BUR). The tube is rapidly cooled using a cooling ring on the outside surface of the film and collapsed between a pair of hip rollers and wound onto a roll.

Films also may be produced using conventional film casting procedures whereby the composition is melted and continuously extruded through a slot die onto a chill roll where it is quenched and solidified. The film is then stripped from the chill roll and wound.

Based on the improved WVTR and oxygen permeability of films produced using the compositions of the invention, it is anticipated the compositions will be useful for the manufacture of gloves and medical garments and that films produced therefrom will be suitable for use as backing materials for diapers, sanitary napkins, bladder protection pads and the like.

While compositions of the invention are primarily useful for film and film-related applications, they may also be used for the production of molded articles and rigid packaging. Molded goods may be produced by blow molding or injection molding.

The following examples illustrate the invention; however, those skilled in the art will recognize numerous variations which are within the spirit of the invention and scope of the claims.

For all of the following examples, the compositions were prepared using a two-step procedure wherein a masterbatch of the base resin and polymeric polyol was first prepared by melt mixing the two components in a Banbury mixer and pelletizing. The pelletized masterbatch was then combined with pelletized modified polyolefin and melt blended under reactive compounding conditions in a twin screw extruder to effect an increase in ER.

Masterbatches were prepared using a Kobelco Stewart Bolling Banbury mixer by introducing a dry blend of the base resin and polyester polyol into the chamber of the mixer maintained at 90° C. Mixing was carried out at 120 rpm and 20 psi ram pressure. Flux was achieved after approximately one minute. The ram was then raised and any material clinging to the throat of the mixer scraped into the mixing chamber. Pressure was reapplied and mixing continued for at least 3 minutes. The stock was then dropped into a single screw extruder and pelletized using a strand cut pelletizer. The pelletized masterbatch was then dry blended with pellets of the modified polyolefin and the mixture extruded through at ZSK-30 twin screw extruder equipped with 10 heating zones maintained at 150° C. up to 230° C. The screw speed was 250 rpm and die temperature was 240° C. The extrudate was strand cut into pellets. ER was determined on the pellets and 1 mil thick film prepared and evaluated for WVTR (ASTM F 1249) and oxygen permeation (ASTM D 3985).

Film was produced using a David Standard blown film unit equipped with an 8 inch annular die. Extruder temperatures in the four heating zones ranged from 193° C. to 227° C. and the die block temperature was 210° C. The BUR was 2.5:1 and frost line height was 15 inches.

EXAMPLE 1

In accordance with the above-described procedures a composition of the invention comprised of 88.2 wt. % LLDPE, 1.8 wt. % polymeric polyol and 10 wt. % modified polyolefin was prepared and 1 mil film produced therefrom. The LLDPE used was a copolymer of ethylene and hexene-1 and had an MI of 1 g/10 min and density of 0.918 g/cm$^3$. The polyester polyol was a linear aliphatic polyester polyol derived from adipic acid and 1,6-hexanediol having a hydroxyl number of 110-114 and viscosity of 380 cps at 60° C. The modified polyolefin was HDPE (density 0.956 g/cm$^3$; MI 9.5 g/10 min) grafted with 1.9 wt. % maleic anhydride. To obtain the above composition 90 wt. % of a masterbatch (98 wt. % LLDPE/2 wt. % polyester polyol) was melt blended with 10 wt. % of the grafted HDPE. Whereas the LLDPE base resin had an ER of 0.91, after melt blending, i.e., reactive compounding, the LLDPE/polyester polyol masterbatch and maleic anhydride grafted HDPE, the ER was 2.37—an increase of more than 150%. The increase in ER is particularly significant considering that when comparative blends comprised of the LLDPE base resin 90 wt. % and 10 wt. % of the maleic anhydride grafted HDPE (Blend A) and 98.2 wt. % of the LLDPE base resin and 1.8 wt. % of the polyester polyol (Blend B) were identically processed, ERs of the respective blends were only 0.92 and 0.91. WVTR and oxygen permeability of 1 mil films prepared from the composition of the invention were significantly higher than obtained for 1 mil film of the LLDPE base resin. Comparative WVTR and oxygen permeability results are set forth in Table 1 along with other film properties. It is apparent from the data, that in addition to significantly improving WVTR and oxygen permeability, other film properties compared favorably or were superior to those of the LLDPE base resin film.

Additionally, the films produced from the compositions of the invention exhibited much improved hand, i.e., softer touch, than the LLDPE base resin films and they were less noisy, i.e., produced less of a crinkly sound, when handled.

TABLE 1

Film Property Comparison

| Film Properties | Test Method | Composition of Example 1 | LLDPE Base Resin |
|---|---|---|---|
| WVTR (g/m$^2$/day) | | 30 | 17 |
| Oxygen Permeability (cc/m$^2$/day) | | 15300 | 8700 |
| Blocking (grams) | ASTM D 3354 | 35 | 99 |
| Dart Drop (grams) | ASTM D 1709 | 51 | 126 |
| 1% Modulus - MD (psi) | ASTM D 790 | 45700 | 33800 |
| 1% Modulus - TD (psi) | ASTM D 790 | 63400 | 39900 |
| Tear - MD (grams) | ASTM D 1922 | 38 | 480 |
| Tear - TD (grams) | ASTM D 1922 | >970 | 640 |
| Heat seal strength (psi) | ASTM F 2029 | 2.8 | 2.1 |
| Elongation at Break (%) | ASTM D 638 | 560 | 570 |
| Tensile Strength | ASTM D 638 | 2060 | 1740 |

EXAMPLE 2

Example 1 was repeated except that a different polyester polyol was employed. The polyester polyol employed for this example was a branched adipate derived from adpic acid and a mixture of ethylene glycol, trimethylol propane and 1,4-butanediol and had a hydroxyl number of 53-59 and viscosity of 3900 cps at 40° C. All other components and procedures were the same as in Example 1. The composition, after reactive compounding, had an ER of 1.69—an increase of 84% over that of the LLDPE base resin. One mil film blown from the composition of the invention had a WVTR value of 29 g/m$^2$/day and oxygen permeability value of 14310 cc/m$^2$/day. Both values are significant improvements over that obtained for a 1 mil film of the LLDPE base resin by itself, namely, 17 g/m$^2$/day and 8700 cc/m$^2$/day, respectively.

EXAMPLE 3

Another composition of the invention was prepared in accordance with the procedure of Example 1. This composition was comprised of 88.2 wt. % of the LLDPE, 10 wt. % of the maleic anhydride grafted HDPE and 1.8 wt. % of a polyester polyol derived from adipic acid and a mixture of trimethylol propane, ethylene glycol and 1,4-butanediol. The polyester polyol had a hydroxyl number of 53-59 and viscosity of 3900cps at 40° C. All other components and procedures were the same as described for Example 1. Blown film (1 mil) obtained using the compositions of this example had WVTR and oxygen permeability values of 28 g/m$^2$/day and 13830 cc/m$^2$/day, respectively. The composition had an ER of 1.76 after melt blending, i.e., reactive compounding. This is an approximate 90% increase over the ER of the LLDPE base resin.

We claim:

1. A melt blended composition comprising:
    (a) 70 to 97 weight percent, based on the total weight of the composition, linear low density polyethylene base resin;
    (b) 2.5 to 25 weight percent, based on the total weight of the composition, modified polyolefin containing acid or acid derivative functionality; and
    (c) 0.5 to 5 weight percent, based on the total weight of the composition, polyester polyol.

2. The melt blended composition of claim 1 wherein (a) is a copolymer of ethylene and a $C_{3-8}$ α-olefin having a density from 0.890 to 0.930 g/cm$^3$ and melt index from 0.1 to 10 g/10 min, (b) is a polyethylene resin grafted with an unsaturated carboxylic acid or carboxylic anhydride; and (c) is an aliphatic polyester polyol having a hydroxyl number from 50 to 115 mg. KOH per gram.

3. The melt blended composition of claim 2 wherein (a) is a copolymer of ethylene and 2 to 25 weight percent butene-1 or hexene-1 having a density from 0.905 to 0.922 g/cm$^3$ and melt index from 0.5 to 5 g/10 min.

4. The melt blended composition of claim 2 wherein (b) is a high density polyethylene resin or linear low density polyethylene resin grafted with from 0.2 to 4 weight percent maleic anhydride.

5. The melt blended composition of claim 2 wherein (c) is derived from adipic acid and a $C_{2-6}$ aliphatic diol or mixture of $C_{2-6}$ aliphatic diols and trimethylol propane or diethylene glycol and has a hydroxyl number from 50 to 70 mg. KOH per gram.

6. The melt blended composition of claim 2 comprising 80 to 94 weight percent (a), 5 to 15 weight percent (b) and 1 to 5 weight percent (c).

7. The melt blended composition of claim 2 having a melt index from 0.1 to 10 g/10 min after reactive compounding and wherein the components are melt blended under conditions of mixing and shear such that the melt elasticity is at least 40% greater than that of the linear low density polyethylene base resin.

8. The melt blended composition of claim 7 wherein (a) is a copolymer of ethylene and 2 to 25 weight percent butene-1 or hexene-1 having a density from 0.905 to 0.922 g/cm$^3$ and melt index from 0.5 to 5 g/10 min., (b) is a high density polyethylene resin or linear low density polyethylene resin grafted with from 0.2 to 4 weight percent maleic anhydride, and (c) is derived from adipic acid and a $C_{2-6}$ aliphatic diol or mixture of $C_{2-6}$ aliphatic diols and trimethylol propane or diethylene glycol and has a hydroxyl number from 50 to 70 mg. KOH per gram.

9. The melt blended composition of claim 8 having a melt elasticity after reactive compounding 65 percent or more greater than that of the linear low density polyethylene base resin.

10. The melt blended composition of claim 8 comprising 80 to 94 weight percent (a), 5 to 15 weight percent (b) and 1 to 5 weight percent (c).

11. The melt blended composition of claim 8 wherein (a) is an ethylene-butene-1 copolymer and (b) is a high density polyethylene resin grafted with from 0.4 to 3.5 weight percent maleic anhydride.

12. The melt blended composition of claim 8 wherein (a) is an ethylene-hexene-1 copolymer and (b) is a high density polyethylene resin grafted with from 0.4 to 3.5 weight percent maleic anhydride.

* * * * *